E. COX.
Corn-Planter.
No. 39,122. Patented July 7, 1863.
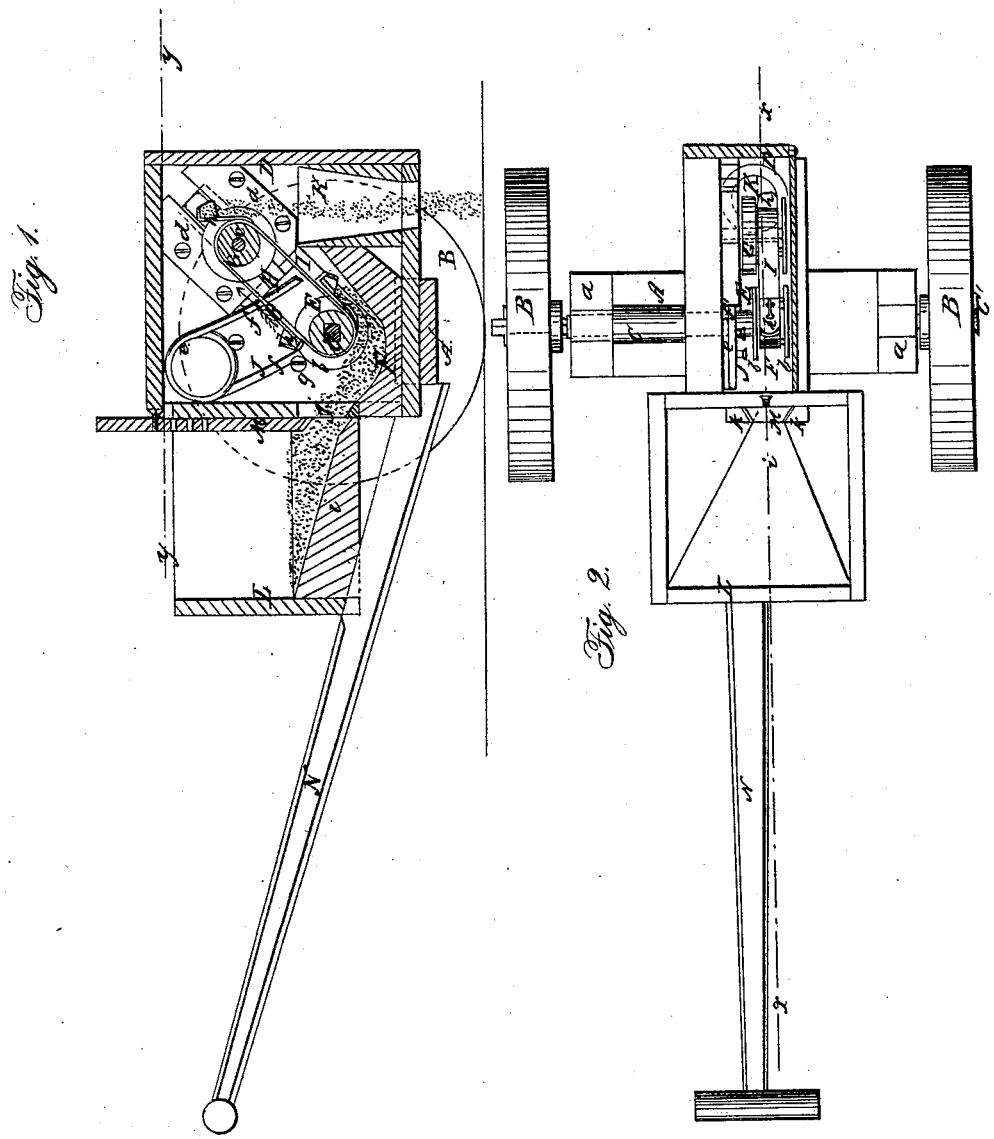
Witnesses:
J W Coombs
G W Reed
Inventor:
Edward Cox
per Munn & Co
attorneys

UNITED STATES PATENT OFFICE.

EDWARD COX, OF POINT PLEASANT, OHIO.

IMPROVEMENT IN SEED-PLANTERS.

Specification forming part of Letters Patent No. 39,122, dated July 7, 1863.

*To all whom it may concern:*

Be it known that I, EDWARD COX, of Point Pleasant, in the county of Clermont and State of Ohio, have invented a new and Improved Seed - Plantering Device; and I do hereby declare that the following is a full, clear, and exact description of the same, reference being had to the accompanying drawings, making a part of this specification, in which—

Figure 1 is a side sectional view of my invention, taken in the line $xx$, Fig. 2; Fig. 2, a horizontal section of the same, taken in the line $yy$, Fig. 1.

Similar letters of reference indicate corresponding parts in the several figures.

This invention consists in a novel seed-distributing device comprised of an elevator formed of cups attached to an endless band or chain having a tension-spring connected with it in such a manner that the belt or chain will always be kept in a proper taut state and made to operate perfectly. The above elevator is placed within a suitable box arranged in relation with a seed-hopper discharge-spout and a cut-off or gate as hereinafter fully shown and described, whereby the seed may be dropped or planted in a perfect manner, or with uniformity and certainty.

To enable those skilled in the art to fully understand and construct my invention, I will proceed to describe it.

A represents a bar, which has a wheel, B, at each end of it. These wheels are placed on separate axles C C', which are fitted in uprights $aa$ at the ends of the bar A.

D is a rectangular box, which is placed on the bar A, and has the axle C extending into it, said axle having a pulley, E, on its inner end, which pulley is within the box D at its lower part, as shown in Fig. 1. The pulley E is provided with a flange, $b$, at each side of it, and directly below said pulley there is a concave, F, which is secured to the bottom of the box.

G is a pulley similar to E, and having an axis, $c$, which is attached to a slide, H, the latter being placed between two guides, $dd$.

I is an endless belt or chain, which passes around the two pulleys E G, and is kept at a proper state of tension by means of a spring, J, which may be constructed of a piece of wire bent so as to have one or more spiral convolutions, $e$, and two straight portions, $ff'$, one of which, $f$, bears against a stop, $g$, and the other, $f'$, against the slide H, as shown clearly in Fig. 1.

To the belt or chain I there are attached a series of cups or buckets, $h$, which may be constructed of sheet metal or any suitable material, and secured to the belt or chain at suitable and equal distances apart.

K is a vertical discharge-spout, which is at the back part of the box D and below the pulley G, and L is a seed-hopper, which is at the front side of box D. This seed-hopper may be of rectangular form, and it is provided with an inclined bottom, $i$, so arranged as to have a tendency to cause the seed in the hopper to pass by its own gravity toward an opening, $j$, which forms a communication between the hopper and the box D.

M is a gate which is fitted between two guides, $kk$, and works over the opening $j$. By means of this gate the capacity of the opening $j$ may be varied as required, or it may be entirely closed, when necessary or desired.

N is a pole which is attached at right angles and centrally to the bar A. The outer end of the seed-hopper may rest on the pole N.

The operation is as follows: The device is shoved along by hand, or in large machines horses may be employed. The seed-hopper L is supplied with seed, and the gate M is adjusted so as to admit of a requisite supply passing into the box D and into or upon the concave F. The endless belt or chain I is moved in the direction indicated by the arrows, the pulley E communicating motion to it from the axle C. The cups or buckets $h$ take up the seed and discharge it into spout K as they pass over the upper pulley, G.

The cups or buckets $h$ may be attached to the belt or chain I at a greater or less distance apart, according to the distance required between the droppings of seed, and a plurality of belts or chains I may be used and placed side by side for sowing seed in drills.

Instead of two wheels, one wheel might be used for a hand device, the frame being arranged similar to that of a wheelbarrow.

I do not claim separately the endless belt or chain with cups or buckets attached; but I do claim as new and desire to secure by Letters Patent—

The arrangement of the slide H and spring J with the pulleys E G, belt I, seed-cups h, concave F, box D, spout K, gate M, and seed-hopper L, all in the manner herein shown and described.

EDWARD COX.

Witnesses:
ISAAC MITCHELL,
A. GALBREATH.